UNITED STATES PATENT OFFICE.

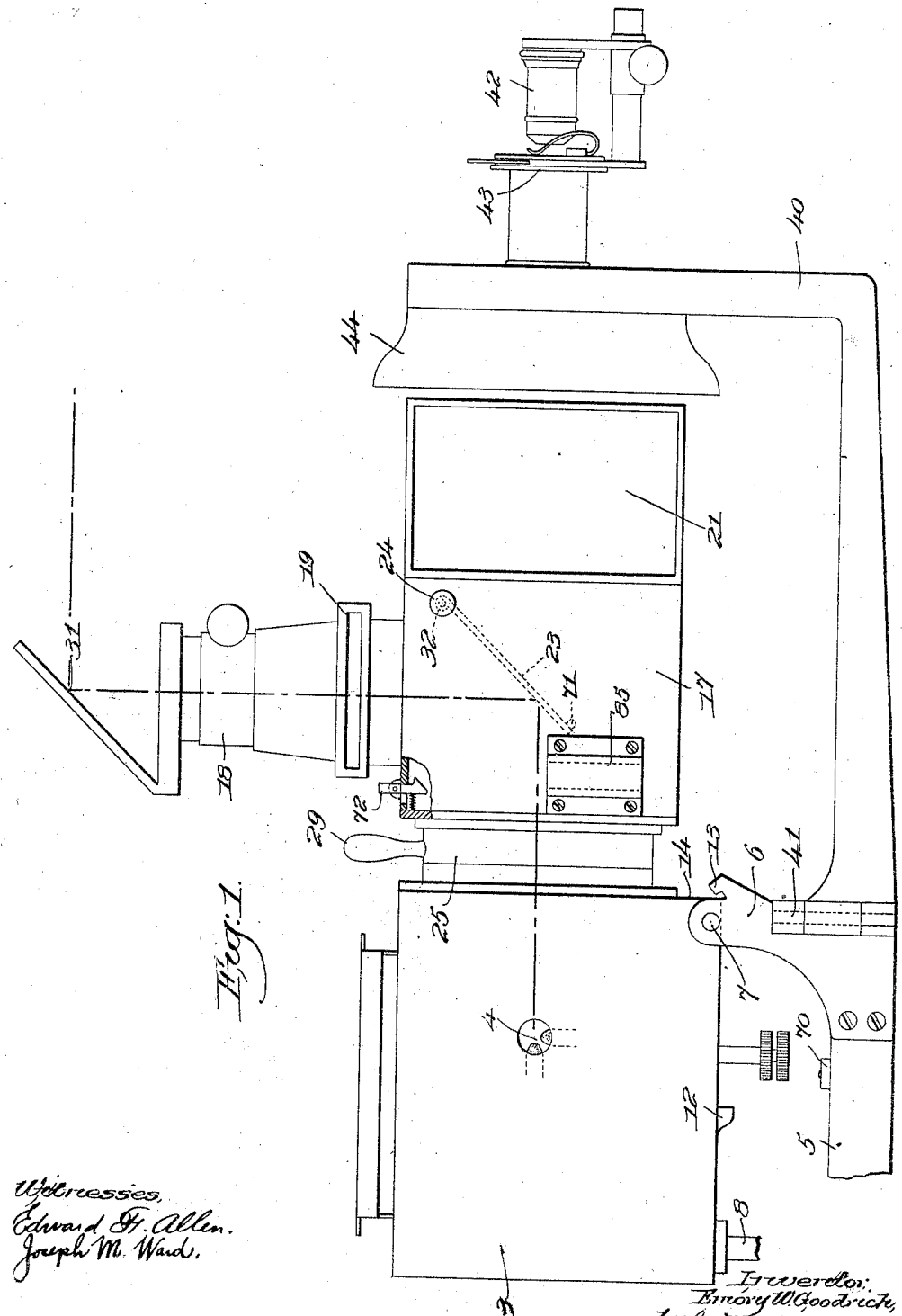

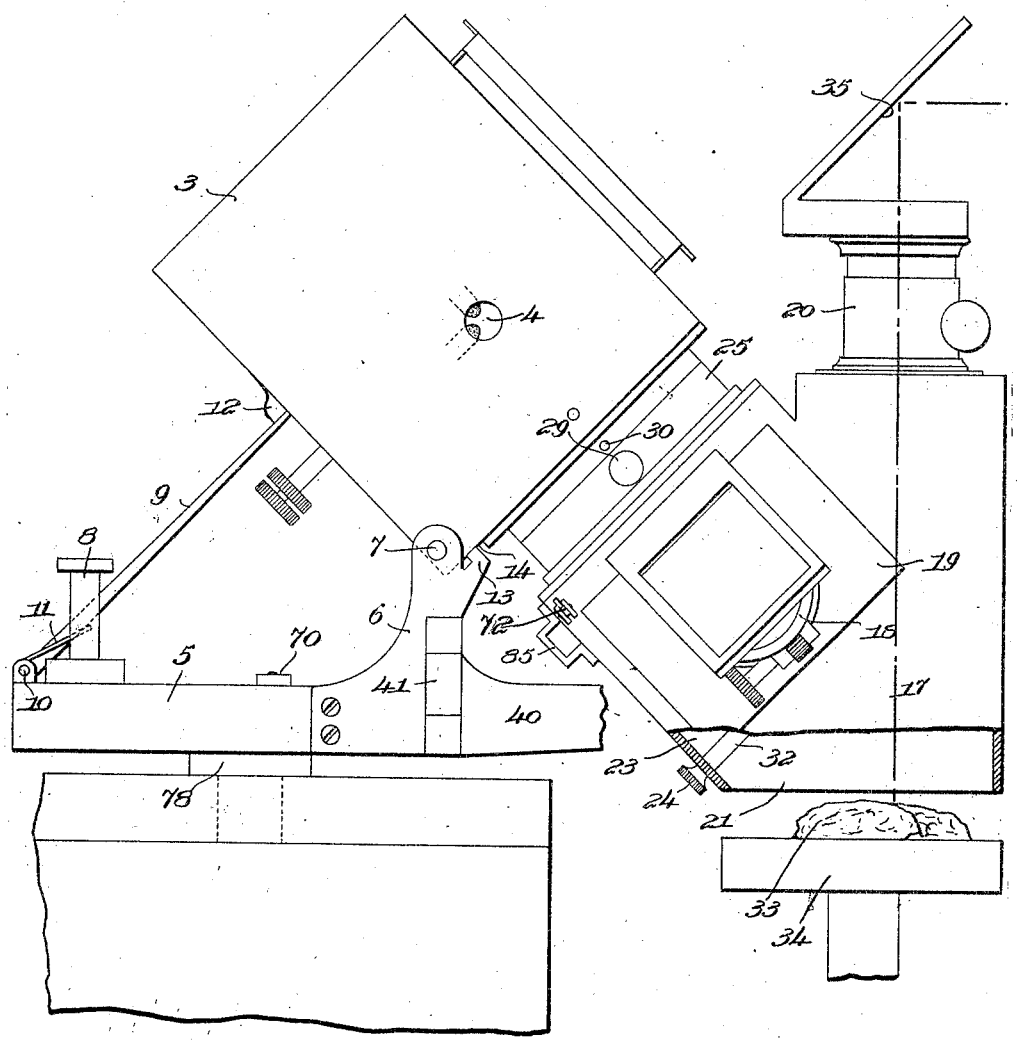

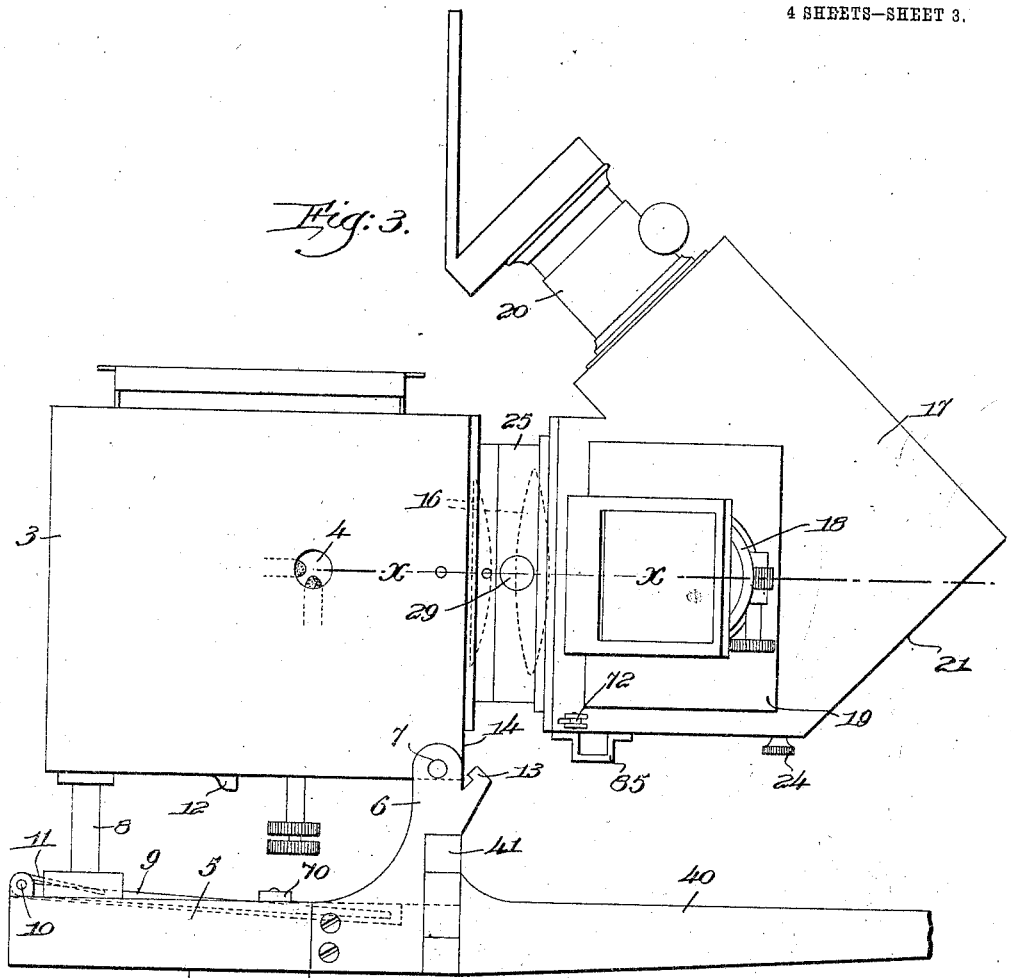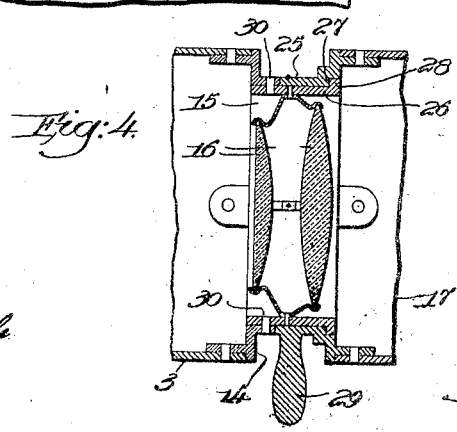

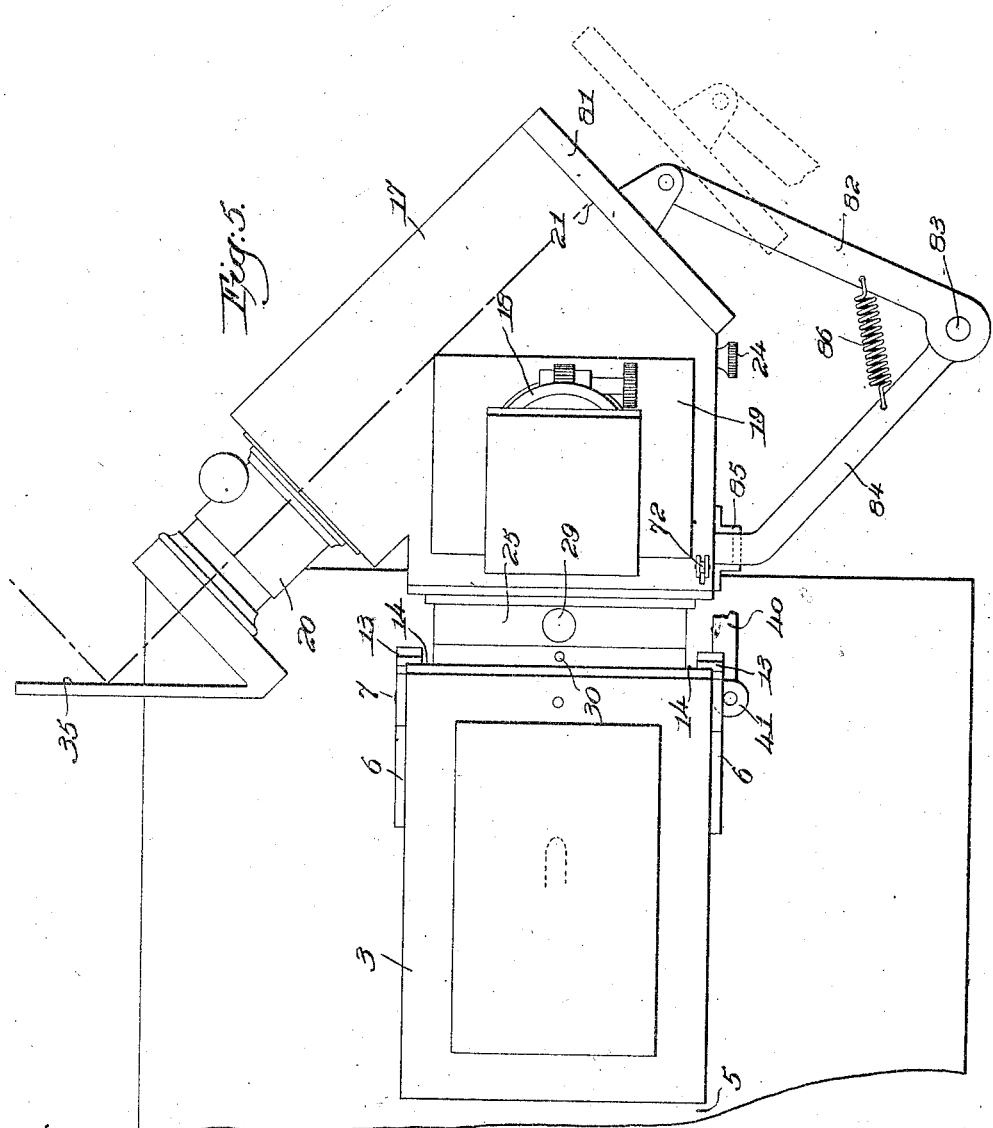

EMORY W. GOODRICH, OF BOSTON, MASSACHUSETTS.

PROJECTION APPARATUS.

1,038,349.

Specification of Letters Patent. Patented Sept. 10, 1912.

Application filed December 30, 1910. Serial No. 600,165.

*To all whom it may concern:*

Be it known that I, EMORY W. GOODRICH, a citizen of the United States, residing at Boston, county of Suffolk, and State of Massachusetts, have invented an Improvement in Projection Apparatus, of which the following description, in connection with the accompanying drawing, is a specification, like characters on the drawing representing like parts.

This invention relates to projection apparatus of that type which can be used for both opaque and transparent projection work, and the objects of the invention are to provide a novel projection apparatus which is comparatively simple and which can be readily adapted either for opaque or transparent projection work and which can also be used for microscopic projection work; and to provide an apparatus by which the image of either the transparent or the opaque object may be projected onto the screen with the apparatus in any one of several positions.

Other objects of my invention will more fully hereinafter appear and the novel features of the invention will then be pointed out in the appended claims.

Referring now to the drawings, Figure 1 is a side view of the projection apparatus embodying my invention showing it adapted for transparent projection work; Fig. 2 is a similar view showing it adapted for opaque projection work; Fig. 3 is a side view showing the parts in position for microscopic projection work; Fig. 4 is a sectional view on the line *x—x*, Fig. 3; Fig. 5 shows a modification of the invention.

3 designates a lamp house of any suitable construction having a lamp 4 or other source of illumination therein. I have not illustrated the lamp in detail as it may be of any suitable construction and forms no part of the present invention. This lamp house is movably mounted on a base or support 5 so that it can be tipped into different positions according to the use to which the apparatus is to be put. In the present embodiment of my invention the lamp house is pivoted at 7 to brackets 6 secured to the base or table 5, the pivotal point 7 being situated near the lower front corner of the lamp house. This permits the lamp house to be tipped from its horizontal position shown in Fig. 1, in which position it is properly placed for either transparent projection work or microscopic projection work, into the inclined position shown in Fig. 2, which is the position adapted for opaque projection work. The lamp is supported in its horizontal position shown in Fig. 1 by means of a suitable post or rest 8 carried by the table 5 and it may be sustained in its inclined position shown in Fig. 2 in any suitable way. I have herein shown for this purpose a strut or brace 9 which is pivoted to the table at 10 and is adapted to engage the under side of the lamp house 3, said brace being acted on by a suitable spring 11 which tends to throw it upwardly while permitting it to fold downwardly against the table. When the lamp is in its horizontal position, the strut 9 may be held against the table by a button or catch 70 which can be turned to release the strut whenever the latter is to be used. When the lamp house is tipped upwardly and the strut is released, the spring 11 will throw the strut into its operative position against the stop 12 carried by the lamp house, as seen in Fig. 2; and the stop serves to hold the strut in its operative position. Any other suitable way of supporting the lamp house in its inclined position may be adopted, however. I have herein shown each bracket 6 as provided with a rest 13 against which the front face 14 of the lamp house engages when the latter is in its inclined position, and this rest combined with the strut 9 serves to firmly hold the lamp house in such position. The face 14 of the lamp house is provided with an opening 15, see Fig. 4, in which opening are sustained condensing lenses 16 which may have any suitable or usual construction.

17 is a housing or light hood adapted to sustain the objectives for both the transparent and the opaque projection work. The objective for the transparent projection work is shown generally at 18 and is mounted on one side of the housing 17 to extend at right angles therefrom, and this objective has associated therewith the usual slide carrier 19 in which the transparencies are inserted. The objective for the opaque projection work is shown at 20 and this is situated in a plane at right angles to that of the objective 18 and at an angle to the beam of light collimated by the condensing lenses 16. The light hood 17 is of the angular shape shown and is provided with the open side 21 which is in a plane at right angles to the objective 20 and at an angle to the collimated beam of light.

Situated inside of the light hood 17 is a reflector 23 which may be either a mirror or a polished metal surface, or a reflector of any suitable character. This reflector is hinged within the light hood at 32 and is adapted to be folded against the side of the light hood or thrown down into the dotted line position Fig. 1 thereby to reflect the beam of light collimated by the condensing lenses upwardly into the objective 18.

The housing 17 is mounted to turn about a horizontal axis so as to bring either of the objectives 18 or 20 into operative position. The housing 17 is herein shown as sustained by the lamp house 3 and I provide for turning the housing by using a swivel connection between the latter and the lamp house. Fig. 4 shows this swivel connection most clearly and on referring to said figure, it will be seen that the housing 17 is provided with a sleeve 25 which encircles and can turn about a bushing or sleeve 26 projecting from the lamp house 3. The sleeve 25 is interiorly shouldered at 27 and the sleeve 26 is provided with the exterior shoulder or flange 28 engaging the shoulder 27. The sleeve 25 is provided with a handle 29 by which the housing 17 may be turned into its proper position axially. In order to provide for assembling the parts I propose to make the sleeve 26 separate from the front side 14 of the lamp house 3 and to slip said sleeve through the sleeve 25 from the interior of the housing 17, and thereafter permanently secure the sleeve 26 to the lamp house by means of rivets or screws 30.

When the device is to be used for transparent projection work the housing is turned relative to the lamp house so as to bring the objective 18 into a vertical position, as shown in Fig. 1, and the reflector 23 is then thrown down into the dotted line position so that it will reflect the collimated beam of light upwardly into the objective 18. Said objective has a reflector 31 associated therewith which reflects the projected image onto the screen. The reflector 23 may be swung from one position to the other by any suitable means, as, for instance, by a thumb-piece 24 which is secured to the shaft on which the reflector is sustained, and a rest or stop 71 is provided to support it at the proper angle. When the reflector is not in use it may be swung into inoperative position against the side of the light hood 17 and held there by any suitable catch 72. This catch can be readily operated from the exterior of the light hood when the reflector is to be released. When the apparatus is to be used for opaque projection work the light hood 17 is turned through an angle of 90° to bring the objective 18 into a horizontal position and the objective 20 into a vertical position, and then the lamp house and light hood are tipped up into the angular position shown in Fig. 2 so as to bring the open side 21 of the light hood into horizontal position. The mirror or reflector 23 is swung into inoperative position against the side of the light hood 17 where it is retained by the catch 72. The beam of light collimated by the condensing lenses 16 is thrown through the open side 21 of the light hood 17 onto an opaque object 33 supported on a table 34, and the light rays reflected from this illuminated object 33 pass through the objective 20 and are reflected by the mirror or reflector 35 onto the screen. The shape of the light hood 17 is such that when the lamp house is tipped into its inclined position shown in Fig. 2, the objective 20 will stand vertically and therefore the reflector 35 will reflect the projected image in the same direction as the reflector 31 when the objective 18 is in operative position.

To use the apparatus for microscopic projection work the lamp is swung into its horizontal position, as shown in Figs. 1 and 3, and a support for the projecting microscope is provided which is adapted to sustain said microscope in line with the open side 21 of the light hood 17 so that the collimated beam of light will be projected through said open side 21 and directed to the projecting microscope. Said support is shown at 40 and it is pivoted to the table 5 in any suitable way, as at 41. Said support carries a projecting microscope 42, 43 of any usual construction, a detailed description of which is not necessary as it is well known and forms no part of my invention. This support is provided with a shield 44 to prevent too great diffusion of light.

By swiveling the light hood to the lamp house it is possible to use the device for both opaque and transparent projection work with the light hood in different relative positions. In Fig. 1, the apparatus is shown as arranged for transparent projection work with the objective 18 standing vertically. The device can be used for transparent projection work, however, if the light hood is turned around through 90° so that the objective 18 will stand horizontally.

The table 5 is mounted on a turn table support 78 of any suitable construction so that said table can be turned about a vertical axis and by turning the light hood into the position shown in Fig. 5, that is, with the objective 18 standing vertically and with the objective 20 in a horizontal plane, and by turning the table 5 on its turn-table support 78, the device may be used for opaque projection work without the necessity of tipping the lamp house into the inclined position. To do this necessitates the use of an auxiliary holder 81 for the opaque object. This holder is shown as carried by an arm 82 pivoted at 83 to a support 84 that is detachably sustained by a bracket 85 carried by the side of the light hood. A spring 86 connecting the arm 82 and support 84 serves to yieldingly hold the holder 81 against the open side 21 of the light hood. This arrangement is suitable for projecting images of opaque objects, such as cards or other articles that can be shown in either a vertical or a horizontal position. This position of the projection apparatus is similar to that shown in Fig. 1 so that by the use of this auxiliary holder 81, it is possible to project images of either opaque or transparent objects without shifting the position of the lamp house, and by simply turning the table 5 about its turn-table support 78 so that the image will be projected in the direction of the screen and in addition throwing the reflector 23 into or out of operative position according as the image is from an opaque or transparent article.

Having fully described my invention, what I claim as new and desire to secure by Letters Patent is:

1. In a projection apparatus, the combination with a lamp house provided with means to project a beam of light, of means supporting said lamp house to permit it to be turned into positions with the beam of light extending either horizontally or in a downwardly-inclined direction, a housing secured to and movable with the lamp house, said housing being open on the side toward which the beam of light is directed, and an objective lens carried by the housing and situated with its optical axis directed toward said open side.

2. In a projection apparatus, the combination with a lamp house provided with means to project a beam of light, of means supporting said lamp house to permit it to be turned into positions with the beam of light extending either horizontally or in a downwardly-inclined direction, a housing secured to and movable with the lamp house, said housing being open on the side toward which the beam of light is directed, and an objective lens carried by the housing and situated with its optical axis extending at an angle to the beam of light and directed toward the open side.

3. In a projection apparatus, the combination with a base or table, of a lamp house provided with means to project a beam of light, means for supporting said lamp house for movement into different positions about an axis transverse to the axis of the beam of light, a housing secured to and movable with the lamp house and provided with an open side in line with said beam, and an objective lens sustained by the housing and having its optical axis directed toward said open side.

4. In a projection apparatus, the combination with a lamp house, a source of illumination therein and condensing lenses, of a housing swiveled to said lamp house to turn about the beam of light as an axis, and two objectives carried by said housing.

5. In a projection apparatus, the combination with a lamp house, a source of illumination therein and condensing lenses, of a housing swiveled to the lamp house to turn about the axis of the beam of light collimated by the condensing lenses, said housing having an angularly-disposed open side in the path of said beam, an opaque projection objective carried by the housing in line with said open side, a transparent projection objective also carried by the housing, and a movable reflector within the housing to reflect the collimated beam of light into the latter objective.

6. In a projection apparatus, the combination with a lamp house, a source of illumination therein and condensing lenses, of a housing swiveled to the lamp house to turn about the axis of the beam of light collimated by the condensing lenses, said housing having an angularly-disposed open side in the path of said beam, an opaque projection objective carried by the housing in line with said open side, a transparent projection objective also carried by the housing, a movable reflector within the housing to reflect the collimated beam of light into the latter objective, and a support by which the lamp house is pivotally sustained whereby the latter may be placed in a horizontal position for transparent projection work or tipped into an inclined position for opaque projection work.

7. In a projection apparatus, the combination with a lamp house having a source of illumination therein and condensing lenses, of a housing connected to the lamp house and provided with an open side, through which the beam of light collimated by the condensing lens is directed, a transparent projection objective extending laterally from said housing, a movable reflector within the housing to reflect the collimated beam of light into said objective, and a microscopic objective supported in line with said open side.

8. In a projection apparatus, the combination with a lamp house provided with means to project a beam of light, of means supporting said lamp house to permit it to be turned into different angular positions about an axis transverse to said beam of light, a housing secured to and movable with the lamp house and provided with an open side toward which said beam of light is projected, and two objectives carried by said housing.

9. In a projection apparatus, the combination with a lamp house provided with means to project a beam of light, of means supporting said lamp house to permit it to be turned into different angular positions about an axis transverse to said beam of light, a housing secured to and movable with the lamp house and provided with an open side toward which said beam of light is projected, two objectives carried by said housing, one of said objectives having its optical axis directed toward said open side, and a movable reflector to reflect the beam of light into the other objective.

10. In a projection apparatus, the combination with a lamp house provided with means to project a beam of light, of means supporting said lamp house to permit it to be turned about an axis transverse to the beam of light to bring said beam of light either into a horizontal position or into a downwardly-inclined position, a housing secured to and movable with the lamp house, said housing being open on the side toward which the beam of light is directed, an objective carried by the housing, a reflector to reflect the beam of light through said objective, and a microscopic objective supported independently of the housing and in line with the beam of light when the latter is projected horizontally.

11. In a projection apparatus, the combination with a lamp house provided with means to project a beam of light, of means supporting said lamp house to permit it to be turned about an axis transverse to the beam of light into positions to project the beam of light either horizontally or downwardly, a housing secured to and movable with the lamp house, said housing being open on the side toward which the beam of light is directed, an objective carried by the housing and situated with its optical axis directed toward the open side, a second objective carried by the housing, and a movable reflector to reflect the beam of light toward the second objective.

12. In a projection apparatus, the combination with a lamp house provided with means to project a beam of light, of means supporting said lamp house to permit it to be turned about an axis transverse to the beam of light into positions to project the beam of light either horizontally or downwardly, a housing secured to and movable with the lamp house, said housing being open on the side toward which the beam of light is directed, and two objectives carried by the housing.

13. In a projection apparatus, the combination with a lamp house, a source of illumination therein, and condensing lenses, of a housing swiveled to the lamp house to turn relative thereto about the beam of light as an axis, and an objective carried by said housing.

14. In a projection apparatus, the combination with a lamp house, a source of illumination therein, and condensing lenses, of a housing swiveled to the lamp house to turn relative thereto about the beam of light as an axis, said housing being open on that side toward which the beam of light is directed, and an objective carried by the housing and situated with its optical axis directed toward said open side.

In testimony whereof, I have signed my name to this specification, in the presence of two subscribing witnesses.

EMORY W. GOODRICH.

Witnesses:
 LOUIS C. SMITH,
 THOMAS J. DRUMMOND.